(12) United States Patent
Yang et al.

(10) Patent No.: US 8,576,274 B2
(45) Date of Patent: Nov. 5, 2013

(54) WIRELESS VIDEO CONFERENCE SYSTEM AND MULTI-CONFERENCE SWITCHING METHOD THEREOF

(75) Inventors: Hui Yang, Shenzhen (CN); Sen Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1 day.

(21) Appl. No.: 13/257,879

(22) PCT Filed: Sep. 10, 2010

(86) PCT No.: PCT/CN2010/076807
§ 371 (c)(1),
(2), (4) Date: Jul. 12, 2012

(87) PCT Pub. No.: WO2011/095004
PCT Pub. Date: Aug. 11, 2011

(65) Prior Publication Data
US 2012/0268549 A1   Oct. 25, 2012

(30) Foreign Application Priority Data
Feb. 4, 2010 (CN) .......................... 2010 1 0112796

(51) Int. Cl.
*H04N 7/14* (2006.01)
(52) U.S. Cl.
USPC .................. 348/14.11; 348/14.02; 348/14.05; 348/14.09; 455/416
(58) Field of Classification Search
USPC .......... 348/14.01, 14.02, 14.03, 14.05, 14.07, 348/14.08, 14.09, 14.11; 379/202.01, 379/204.01, 205.01; 455/416
See application file for complete search history.

(56) References Cited

U.S. PATENT DOCUMENTS

| | | | |
|---|---|---|---|
| 7,949,117 B2 * | 5/2011 | Jeong et al. | 379/202.01 |
| 2004/0119814 A1 * | 6/2004 | Clisham et al. | 348/14.08 |
| 2005/0181872 A1 | 8/2005 | Acharya et al. | |

(Continued)

FOREIGN PATENT DOCUMENTS

| CN | 1934860 A | 3/2007 |
|---|---|---|
| CN | 101072319 A | 11/2007 |

(Continued)

OTHER PUBLICATIONS

International Search Report in international application No. PCT/CN2010/076807, mailed on Dec. 23, 2010.

(Continued)

*Primary Examiner* — Binh Tieu
(74) *Attorney, Agent, or Firm* — Oppedahl Patent Law Firm LLC

(57) ABSTRACT

The disclosure discloses a wireless video conference system, which comprises: a conference control module and a wireless conference switching module which are located at a system side, and a wireless video conference terminal module located in a wireless terminal, wherein the conference control module is configured, when a new conference is started, to send data information of the new conference and data information of an original conference to the wireless conference switching module; the wireless conference switching module is configured, when the new conference is started, to send a conference start instruction to the wireless terminal in a member list of the new conference, and to switch the wireless terminal to the new conference or maintain the wireless terminal in the original conference according to a conference switching instruction from the wireless terminal; and the wireless video conference terminal module is configured to receive the conference start instruction from the wireless conference switching module, and to send the conference switching instruction to the wireless conference switching module according to a choice of a user. The disclosure further discloses a multi-conference switching method in a wireless video conference system. By the disclosure, the multi-conference switching of the wireless terminal in the wireless video conference system is implemented.

16 Claims, 2 Drawing Sheets

(56) References Cited

U.S. PATENT DOCUMENTS

2009/0047938 A1* 2/2009 Khedher et al. .............. 455/416
2010/0007713 A1   1/2010 Yamamoto
2011/0182415 A1* 7/2011 Jacobstein et al. ....... 379/202.01

FOREIGN PATENT DOCUMENTS

| CN | 101102216 A | 1/2008 |
| CN | 101123524 A | 2/2008 |
| CN | 101127622 A | 2/2008 |
| CN | 101778247 A | 7/2010 |

OTHER PUBLICATIONS

English Translation of the Written Opinion of the International Search Authority in international application No. PCT/CN2010/076807, mailed on Dec. 23, 2010.

* cited by examiner

WIRELESS VIDEO CONFERENCE SYSTEM AND MULTI-CONFERENCE SWITCHING METHOD THEREOF

TECHNICAL FIELD

The disclosure relates to a wireless video conference technology, particularly to a wireless video conference system and a multi-conference switching method thereof.

BACKGROUND

The wireless video conference system is a new video conference manner based on a wireless communication system and a fixed video conference system. The so-called fixed video conference system comprises a conference control module and video conferences, wherein the conference control module and the video conferences are connected by a network Internet Protocol (IP); each video conference has a fixed IP and is connected to a fixed local area network; and the conference control module controls the reception and transmission of the uploaded and downloaded data of each video conference and is used for the data display and transmission of the video conferences. The so-called wireless communication system is, for example, the existing Global System for Mobile Communications (GSM) network, Code Division Multiple Access (CDMA) communication network, Time Division (TD) communication network, or Wideband Code Division Multiple Access (WCDMA) communication network. The so-called wireless video conference system, i.e., a wireless terminal, is connected to the conference control module in the fixed video conference system by a wireless communication network, and used for the connection of video conference and data exchange with other wireless or wired terminals by the conference control module.

In the wireless video conference system, each wireless terminal participating in a conference generally has only one user, who generally hopes to switch in one or more conferences. However, the wireless terminal cannot switch in each conference in the existing wireless video conference systems, so that the multi-conference switching requirement of a user cannot be met.

SUMMARY

For the reason above, the main objective of the disclosure is to provide a wireless video conference system and a multi-conference switching method thereof, in order to realize multi-conference switching of the wireless terminal in the wireless video conference system.

In order to achieve the objective, the technical solution of the disclosure is implemented as follows.

The wireless video conference system provided by the disclosure comprises a conference control module and a wireless conference switching module which are located at a system side, and a wireless video conference terminal module located in a wireless terminal, wherein the conference control module is configured, when a new conference is started, to send data information of the new conference and data information of an original conference to the wireless conference switching module;

the wireless conference switching module is configured, when the new conference is started, to send a conference start instruction to the wireless terminal in a member list of the new conference, and to switch the wireless terminal to the new conference or maintain the wireless terminal in the original conference according to a conference switching instruction from the wireless terminal; and the wireless video conference terminal module is configured to receive the conference start instruction from the wireless conference switching module, and to send the conference switching instruction to the wireless conference switching module according to a choice of a user.

The conference start instruction may comprise: a name of the new conference and a list of conferences the wireless terminal is invited to join.

The conference switching instruction may comprise: a name of a conference required to join and a joining type, wherein the joining type comprises types of permanent joining and temporary joining.

The wireless conference switching module may be further configured not to send the data information of the new conference but just to send the data information of the original conference to the wireless terminal, when the name of the conference required to join is as same as that of the original conference; to stop sending the data information of the original conference and to start to send the data information of the new conference to the wireless terminal, when the name of the conference required to join is different from that of the original conference, and the joining type is permanent joining; and to start to send the data information of the new conference to the wireless terminal, and to suspend sending and retain the data information of the original conference, when the name of the conference required to join is different from that of the original conference, and the joining type is temporary joining.

The wireless conference switching module may be further configured to switch the joining type of the wireless terminal from temporary joining to permanent joining, when a time period during which the joining type of the wireless terminal is temporary joining exceeds a predetermined time limit.

The disclosure further provides a multi-conference switching method in a wireless video conference system, which comprises:

when a new conference is started, a system sends a conference start instruction to a wireless terminal in a member list of the new conference;

the wireless terminal receives the conference start instruction and sends a conference switching instruction to the system according to a choice of a user; and the system switches the wireless terminal to the new conference or maintains the wireless terminal in an original conference according to the conference switching instruction from the wireless terminal.

The conference start instruction may comprise: a name of the new conference and a list of conferences the wireless terminal is invited to join.

The conference switching instruction may comprise: a name of a conference required to join and a joining type, wherein the joining type comprises types of permanent joining and temporary joining.

The system switching the wireless terminal to the new conference or maintaining the wireless terminal in the original conference according to the conference switching instruction from the wireless terminal may comprise: when the name of the conference required to join is as same as that of the original conference, the system does not send data information of the new conference but just sends the data information of the original conference to the wireless terminal; when the name of the conference required to join is different from that of the original conference, and the joining type is permanent joining, the system stops sending the data information of the original conference and starts to send the data information of the new conference to the wireless terminal; and when the name of the conference required to join is different from that of the original conference, and the joining type is temporary joining, the system starts to send the data information of the new conference to the wireless terminal, and suspends sending and retains the data information of the original conference.

The multi-conference switching method may further comprise: when a time period during which the joining type of the wireless terminal is temporary joining exceeds a predetermined time limit, switching the joining type of the wireless terminal from temporary joining to permanent joining.

In the wireless video conference system and the multi-conference switching method thereof provided by the disclosure, when a new conference is started, the system sends a conference start instruction to the wireless terminal in the member list of the new conference; the wireless terminal receives the conference start instruction, and sends a conference switching instruction to the system according to the choice of a user; and the system switches the wireless terminal to the new conference or maintains it in the original conference according to the conference switching instruction from the wireless terminal. By the method and system of the disclosure, the multi-conference switching of the wireless terminal is implemented to bring convenience to the practical application and improve the user experience.

DETAILED DESCRIPTION

The technical solution of the disclosure is further described below with reference to drawings and specific embodiments in detail.

In order to implement multi-conference switching of a wireless terminal in a wireless video conference system, the disclosure provides a multi-conference switching method in a wireless video conference system, and the core idea is: when a new conference is started, a system sends a conference start instruction to a wireless terminal in a member list of the new conference; the wireless terminal receives the conference start instruction, and sends a conference switching instruction to the system according to a choice of a user; and the system determines whether to switch the wireless terminal from an original conference to the new conference according to the conference switching instruction from the wireless terminal.

The conference start instruction needs to comprise: a name of the new conference and a list of conferences the wireless terminal is invited to join, and may also comprise the member list of the new conference. The so-called list of the conferences the wireless terminal is invited to join is the list of the conferences which the wireless terminal can join at present. The name of the new conference can be represented by a code of the conference or other forms. The conference switching instruction comprises: a name of a conference required to join and a joining type. The joining type comprises types of permanent joining and temporary joining.

The step that the system determines whether to switch the wireless terminal from the original conference to the new conference, i.e., switch the wireless terminal to the new conference or maintain the wireless terminal in the original conference, according to the conference switching instruction from the wireless terminal, specifically comprises:

when the name of the conference required to join is as same as that of the original conference, the system does not send data information of the new conference but just sends the data information of the original conference to the wireless terminal, i.e., the conference is not switched;

when the name of the conference required to join is different from that of the original conference, and the joining type is permanent joining, the system stops sending the data information of the original conference and starts to send the data information of the new conference to the wireless terminal; and when the name of the conference required to join is different from that of the original conference, and the joining type is temporary joining, the system starts to send the data information of the new conference to the wireless terminal, and suspends sending and retains the data information of the original conference.

Figure 1:
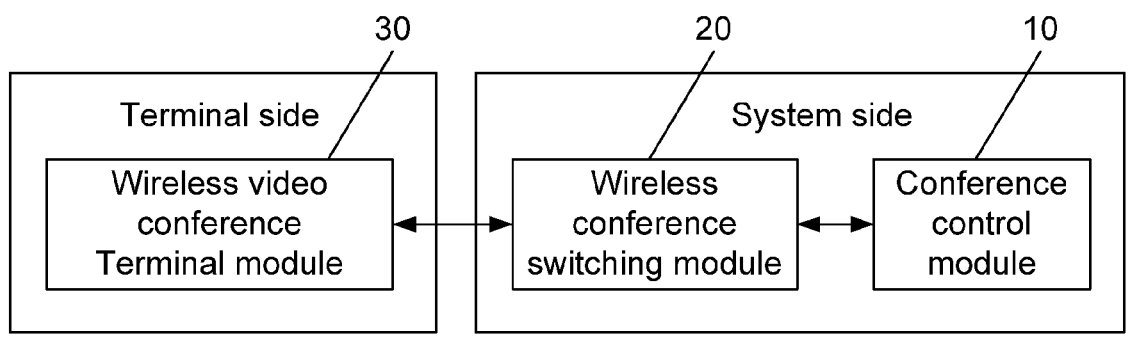
FIG. 1 is a structure diagram of a wireless video conference system in the disclosure.

Corresponding to the multi-conference switching method, the disclosure further provides a wireless video conference system, as shown in FIG. 1, which comprises a conference control module 10 and a wireless conference switching module 20 which are located at a system side, and a wireless video conference terminal module 30 located in a wireless terminal (terminal side).

The conference control module 10 is configured, when a new conference is started, to send data information of the new conference and data information of an original conference to the wireless conference switching module 20.

The wireless conference switching module 20 is configured, when the new conference is started, to send a conference start instruction to the wireless terminal in a member list of the new conference, and to switch the wireless terminal to the new conference or maintain the wireless terminal in the original conference according to a conference switching instruction from the wireless terminal. Specifically: when the name of the conference required to join is as same as that of the original conference, the wireless conference switching module is further configured not to send the data information of the new conference but just to send the data information of the original conference; when the name of the conference required to join is different from that of the original conference and the joining type is permanent joining, the wireless conference switching module is further configured to stop sending the data information of the original conference and to start to send the data information of the new conference to the wireless terminal; when the name of the conference required to join is different from that of the original conference and the joining type is temporary joining, the wireless conference switching module is further configured to start to send the data information of the new conference to the wireless terminal, and to suspend sending and retain the data information of the original conference.

The wireless video conference terminal module 30 is configured to receive the conference start instruction from the wireless conference switching module 20, and to send the conference switching instruction to the wireless conference switching module 20 according to a choice of a user.

It should be explained that the wireless conference switching module 20 can be located at the system side as an independent module, or exist as a new added sub-module of the conference control module 10.

Figure 2:
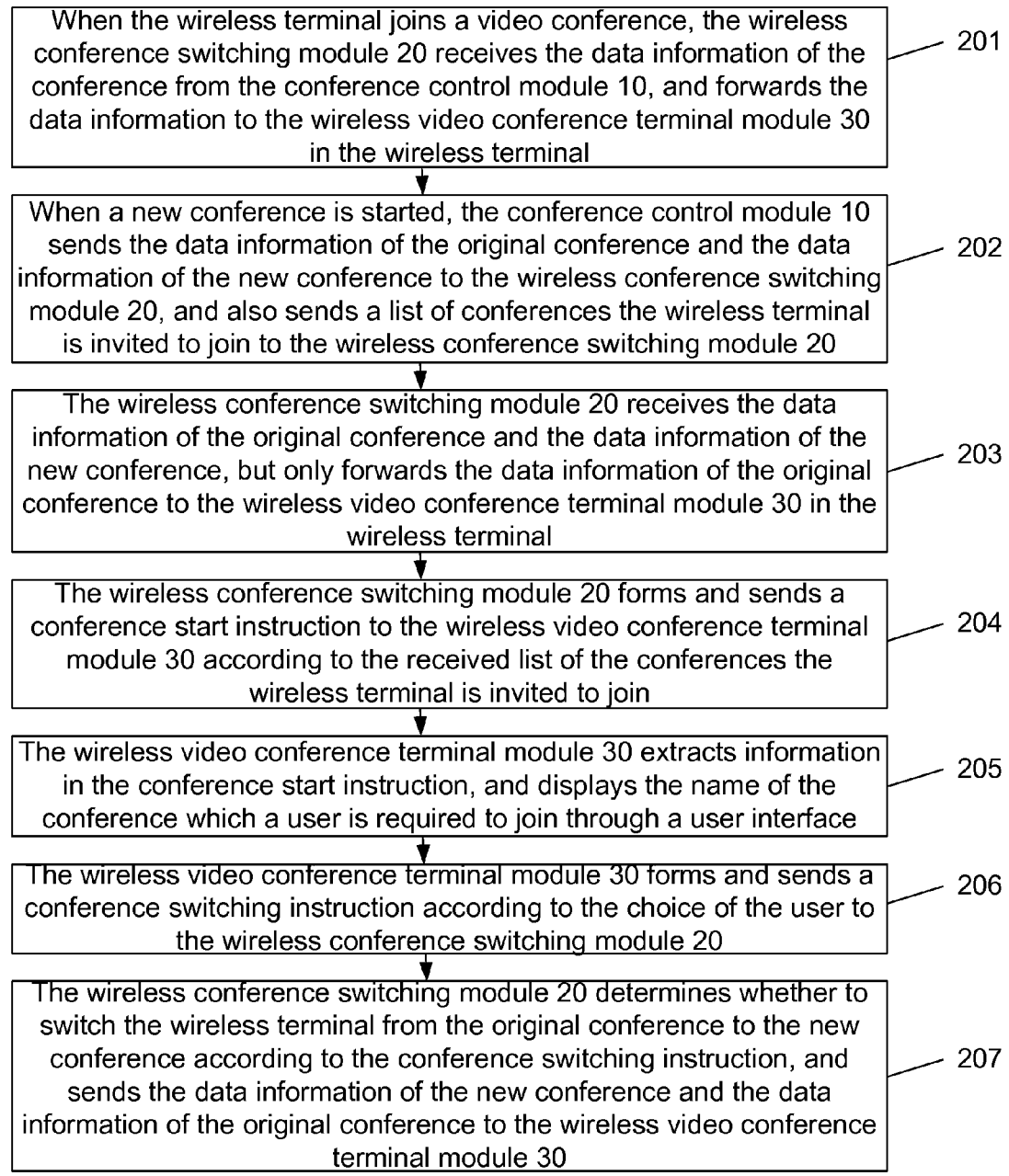
FIG. 2 is a flowchart of a multi-conference switching method in a wireless video conference system in the disclosure.

The multi-conference switching method is further described below with reference to the wireless video conference system in FIG. 1 in detail. As shown in FIG. 2, the method mainly comprises the following steps.

Step S201: When the wireless terminal joins a video conference, the wireless conference switching module 20 receives the data information of the conference from the conference control module 10, and forwards the data information (the data information of the original conference) to the wireless video conference terminal module 30 in the wireless terminal.

Step S202: When a new conference is started (it is assumed that the wireless terminal is in the member list of the new conference), the conference control module 10 sends the data information of the original conference and the data information of the new conference to the wireless conference switching module 20, and also sends a list of conferences the wireless terminal is invited to join to the wireless conference switching module 20.

Step S203: The wireless conference switching module 20 receives the data information of the original conference and the data information of the new conference, but only forwards the data information of the original conference to the wireless video conference terminal module 30 in the wireless terminal.

Step S204: The wireless conference switching module 20 forms and sends a conference start instruction to the wireless video conference terminal module 30 according to the received list of the conferences the wireless terminal is invited to join.

The conference start instruction comprises but is not limited to: the name of the new conference, the list of the conferences the wireless terminal is invited to join, and the member list (optional) of the new conference. The list of the conferences the wireless terminal is invited to join is suitable to be used when the wireless terminal is invited to join more than two conferences at the same time; and of course, the list also comprises the new conference.

Step S205: The wireless video conference terminal module 30 extracts information in the conference start instruction, and displays the name of the conference which a user is required to join through a user interface.

Step S206: The wireless video conference terminal module 30 forms and sends a conference switching instruction according to the choice of the user to the wireless conference switching module 20.

The conference switching instruction comprises but is not limited to: the name of a conference required to join and the joining type, wherein the joining type comprises types of permanent joining and temporary joining. If the user does not hope to perform conference switching, the name of the conference required to join is that of the original conference; if the joining type is permanent joining, it is indicated that the user hopes to maintain in the chosen conference and not to perform conference switching any more; and if the joining type is temporary joining, it is indicated that the user allows to continue to perform conference switching.

Step S207: The wireless conference switching module 20 determines whether to switch the wireless terminal from the original conference to the new conference according to the conference switching instruction from the wireless video conference terminal module 30, and sends the data information of the new conference and the data information of the original conferences to the wireless video conference terminal module 30.

Specifically: when the name of the conference required to join is as same as that of the original conference, the wireless conference switching module 20 does not send the data information of the new conference but just sends the data information of the original conference to the wireless video conference terminal module 30, i.e., the conference is not switched;

when the name of the conference required to join is different from that of the original conference, and the joining type is permanent joining, the wireless conference switching module 20 stops sending the data information of the original conference and starts to send the data information of the new conference to the wireless video conference terminal module 30; and when the name of the conference required to join is different from that of the original conference, and the joining type is temporary joining, the wireless conference switching module 20 starts to send the data information of the new conference to the wireless video conference terminal module 30, and suspends sending and retains the data information of the original conference. Under the circumstance of the temporary joining, the wireless terminal may also switch back to the original conference; therefore, the objective of retaining the data information of the original conference is to send the retained data information of the original conference to the wireless video conference terminal module 30 after the wireless terminal is switched back to the original conference.

It should be explained that the user can switch to a conference by steps 206 and 207 at any time when he hopes so. If there are other new conferences later, the above-mentioned operations in steps 202 to 207 are also available. In addition, the wireless conference switching module 20 adds the list of the conferences the wireless terminal is invited to join into the conference start instruction and sends it to the wireless video conference terminal module 30, so that the list of the conferences the wireless terminal is invited to join, which is stored in the wireless video conference terminal module 30, can be timely upgraded, and that the user can conveniently choose the conference which he hopes to join by switching. For example, the conference control module 10 can timely acquire the update condition of conferences, including the ending of conferences, the addition of conferences, and the like, then timely upgrades the list of the conferences the wireless terminal is invited to join based on the update condition of conferences, including adding or deleting the information and the like in the conference list, and provides the updated conference list to the wireless conference switching module 20; the wireless conference switching module 20 timely notifies the wireless video conference terminal module 30 of the updated conference list through the conference start instruction, so that the conference list on the terminal side can be updated timely and is convenient to be chosen by the user.

As a preferred embodiment of the disclosure, when a time period during which the joining type of the wireless terminal is temporary joining exceeds a predetermined time limit, the wireless terminal can be switched from the temporary joining to the permanent joining, i.e., the wireless conference switching module 20 only sends the data information of the new conference rather than that of the original conference to the wireless terminal, and does not need to retain the data information of the original conference. This is for optimizing the system resources, as no reservation of data information of the original conference again equals to saving the system resources.

To sum up, what described above are only preferred embodiments of the disclosure, and the scope of protection of the disclosure is not limited herein.

What is claimed is:

1. A wireless video conference system, comprising a conference control module and a wireless conference switching module which are located at a system side, and a wireless video conference terminal module located in a wireless terminal, wherein the conference control module is configured, when a new conference is started, to send data information of the new conference and data information of an original conference to the wireless conference switching module;

the wireless conference switching module is configured, when the new conference is started, to send a conference start instruction to the wireless terminal in a member list of the new conference, and to switch the wireless terminal to the new conference or maintain the wireless terminal in the original conference according to a conference switching instruction from the wireless terminal; and the wireless video conference terminal module is configured to receive the conference start instruction from the wireless conference switching module, and to send the conference switching instruction to the wireless conference switching module according to a choice of a user.

2. The wireless video conference system according to claim 1, wherein the conference start instruction comprises: a name of the new conference and a list of conferences the wireless terminal is invited to join.

3. The wireless video conference system according to claim 2, wherein the conference switching instruction comprises: a name of a conference required to join and a joining type, and wherein the joining type comprises types of permanent joining and temporary joining.

4. The wireless video conference system according to claim 3, wherein the wireless conference switching module is further configured not to send the data information of the new conference but just to send the data information of the original conference to the wireless terminal, when the name of the conference required to join is as same as that of the original conference;

to stop sending the data information of the original conference and to start to send the data information of the new conference to the wireless terminal, when the name of the conference required to join is different from that of the original conference, and the joining type is permanent joining; and to start to send the data information of the new conference to the wireless terminal, and to suspend sending and retain the data information of the original conference, when the name of the conference required to join is different from that of the original conference, and the joining type is temporary joining.

5. The wireless video conference system according to claim 4, wherein the wireless conference switching module is further configured to switch the joining type of the wireless terminal from temporary joining to permanent joining, when a time period during which the joining type of the wireless terminal is temporary joining exceeds a predetermined time limit.

6. The wireless video conference system according to claim 1, wherein the conference switching instruction comprises: a name of a conference required to join and a joining type, and wherein the joining type comprises types of permanent joining and temporary joining.

7. The wireless video conference system according to claim 6, wherein the wireless conference switching module is further configured not to send the data information of the new conference but just to send the data information of the original conference to the wireless terminal, when the name of the conference required to join is as same as that of the original conference;

to stop sending the data information of the original conference and to start to send the data information of the new conference to the wireless terminal, when the name of the conference required to join is different from that of the original conference, and the joining type is permanent joining; and to start to send the data information of the new conference to the wireless terminal, and to suspend sending and retain the data information of the original conference, when the name of the conference required to join is different from that of the original conference, and the joining type is temporary joining.

8. The wireless video conference system according to claim 7, wherein the wireless conference switching module is further configured to switch the joining type of the wireless terminal from temporary joining to permanent joining, when a time period during which the joining type of the wireless terminal is temporary joining exceeds a predetermined time limit.

9. A multi-conference switching method in a wireless video conference system, comprising:

when a new conference is started, a system sending a conference start instruction to a wireless terminal in a member list of the new conference;

the wireless terminal receiving the conference start instruction and sending a conference switching instruction to the system according to a choice of a user; and the system switching the wireless terminal to the new conference or maintaining the wireless terminal in an original conference according to the conference switching instruction from the wireless terminal.

10. The multi-conference switching method according to claim 9, wherein the conference start instruction comprises: a name of the new conference and a list of conferences the wireless terminal is invited to join.

11. The multi-conference switching method according to claim 10, wherein the conference switching instruction comprises: a name of a conference required to join and a joining type, and wherein the joining type comprises types of permanent joining and temporary joining.

12. The multi-conference switching method according to claim 11, wherein the system switching the wireless terminal to the new conference or maintaining the wireless terminal in the original conference according to the conference switching instruction from the wireless terminal comprises:

when the name of the conference required to join is as same as that of the original conference, the system not sending data information of the new conference but just sending the data information of the original conference to the wireless terminal;

when the name of the conference required to join is different from that of the original conference, and the joining type is permanent joining, the system stopping sending the data information of the original conference and starting to send the data information of the new conference to the wireless terminal; and when the name of the conference required to join is different from that of the original conference, and the joining type is temporary joining, the system starting to send the data information of the new conference to the wireless terminal, and suspending sending and retaining the data information of the original conference.

13. The multi-conference switching method according to claim 12, further comprising: when a time period during which the joining type of the wireless terminal is temporary joining exceeds a predetermined time limit, switching the joining type of the wireless terminal from temporary joining to permanent joining.

14. The multi-conference switching method according to claim 9, wherein the conference switching instruction comprises: a name of a conference required to join and a joining type, and
   wherein the joining type comprises types of permanent joining and temporary joining.

15. The multi-conference switching method according to claim 14, wherein the system switching the wireless terminal to the new conference or maintaining the wireless terminal in the original conference according to the conference switching instruction from the wireless terminal comprises:
   when the name of the conference required to join is as same as that of the original conference, the system not sending data information of the new conference but just sending the data information of the original conference to the wireless terminal;

when the name of the conference required to join is different from that of the original conference, and the joining type is permanent joining, the system stopping sending the data information of the original conference and starting to send the data information of the new conference to the wireless terminal; and when the name of the conference required to join is different from that of the original conference, and the joining type is temporary joining, the system starting to send the data information of the new conference to the wireless terminal, and suspending sending and retaining the data information of the original conference.

16. The multi-conference switching method according to claim 15, further comprising: when a time period during which the joining type of the wireless terminal is temporary joining exceeds a predetermined time limit, switching the joining type of the wireless terminal from temporary joining to permanent joining.

\* \* \* \* \*